United States Patent
Renner et al.

(10) Patent No.: US 10,495,166 B2
(45) Date of Patent: Dec. 3, 2019

(54) HEAT SHIELD STRUCTURE FOR A WHEEL

(71) Applicant: MUBEA CARBO TECH GMBH, Salzburg (AT)

(72) Inventors: Christoph Renner, Gosau (AT); Sebastian Schmitz, Salzburg (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 0 days.

(21) Appl. No.: 15/537,273

(22) PCT Filed: Dec. 17, 2015

(86) PCT No.: PCT/EP2015/080245
§ 371 (c)(1),
(2) Date: Jun. 16, 2017

(87) PCT Pub. No.: WO2016/097159
PCT Pub. Date: Jun. 23, 2016

(65) Prior Publication Data
US 2018/0038434 A1    Feb. 8, 2018

(30) Foreign Application Priority Data
Dec. 19, 2014   (CH) ...................................... 1994/14

(51) Int. Cl.
*F16D 65/847*    (2006.01)
*B60B 1/06*       (2006.01)
(Continued)

(52) U.S. Cl.
CPC .............. *F16D 65/847* (2013.01); *B60B 1/06* (2013.01); *B60B 7/0093* (2013.01); *B60B 7/18* (2013.01);
(Continued)

(58) Field of Classification Search
CPC ............. F16D 65/847; F16D 2065/785; B60B 7/0093; B60B 2360/10; B60B 2360/141;
(Continued)

(56) References Cited

U.S. PATENT DOCUMENTS 4,017,123 A * 4/1977 Horner ................... B60C 23/18
188/264 G
4,018,482 A * 4/1977 Rastogi .................. B60B 21/08
301/6.8
(Continued)

FOREIGN PATENT DOCUMENTS

CN    104118281 A    10/2014
DE    32 24 929 A1   1/1983
(Continued)

OTHER PUBLICATIONS

Japanese Patent Office, Office Action, Notice of Reasons for Rejection, Japanese Patent Application No. JP2017-530720, dated Mar. 26, 2019 (3 pages).
(Continued)

*Primary Examiner* — S. Joseph Morano
*Assistant Examiner* — Jean W Charleston
(74) *Attorney, Agent, or Firm* — Pauley Erickson & Kottis

(57) ABSTRACT

The invention is directed to a heat shield structure (8) for a wheel (1) which comprises a base structure (11) that is at least partially made from a composite material. The heat shield structure (8) is arranged on the base structure (11) and is at least partially covering the base structure (11).

6 Claims, 4 Drawing Sheets

(51) Int. Cl.
*B60B 7/18* (2006.01)
*B60B 7/00* (2006.01)
*B64C 25/00* (2006.01)
*B60B 3/04* (2006.01)
*B60B 3/10* (2006.01)
*B60B 5/02* (2006.01)
*B64C 25/34* (2006.01)
*F16D 65/78* (2006.01)

(52) U.S. Cl.
CPC .............. *B64C 25/001* (2013.01); *B60B 3/04* (2013.01); *B60B 3/10* (2013.01); *B60B 5/02* (2013.01); *B60B 2360/10* (2013.01); *B60B 2360/141* (2013.01); *B60B 2360/34* (2013.01); *B60B 2360/70* (2013.01); *B60B 2900/921* (2013.01); *B64C 25/34* (2013.01); *F16D 2065/785* (2013.01)

(58) Field of Classification Search
CPC . B60B 2360/34; B60B 2360/147; B60B 3/10; B64C 25/001; B64C 25/34
USPC ....... 301/37.24, 37.25, 37.26, 37.43, 37.105, 301/37.106, 37.107
See application file for complete search history.

(56) References Cited

U.S. PATENT DOCUMENTS

| | | |
|---|---|---|
| 4,900,097 A | 2/1990 | Kostov et al. |
| 5,277,479 A | 1/1994 | Koyama et al. |
| 5,538,114 A | 7/1996 | White et al. |
| 5,899,538 A * | 5/1999 | Tatraux-Paro ............ B60B 5/00 301/63.101 |
| 2010/0194179 A1 | 8/2010 | Waltz |
| 2014/0319901 A1* | 10/2014 | Schmidt .................. B60C 23/19 301/6.91 |

FOREIGN PATENT DOCUMENTS

| | | |
|---|---|---|
| DE | 295 06 703 U1 | 6/1995 |
| DE | 100 06 400 A1 | 8/2001 |
| FR | 2 508 850 A1 | 1/1983 |
| JP | 62-78504 U | 5/1987 |
| JP | 4-254201 A | 9/1992 |
| JP | 6-92101 A | 4/1994 |
| JP | 2010-30374 A | 2/2010 |
| WO | WO 2009/130229 A2 | 10/2009 |

OTHER PUBLICATIONS

China National Intellectual Property Administration, Chinese Office Action, First Notification of Office Action, Chinese Patent Application No. 201580068100.0, dated Nov. 29, 2018 (8 pages).

* cited by examiner

HEAT SHIELD STRUCTURE FOR A WHEEL

BACKGROUND OF THE INVENTION

Field of the Invention

The present invention is directed to heat shield structures, in specific to heat shield structures which can be used for wheels, in particular for wheels made from carbon fiber reinforced plastics suited for motor vehicles and to wheels comprising such heat shield structures.

Discussion of Related Art

When braking, kinetic energy of a vehicle is converted into thermal energy, resulting in high temperatures generated by the brake system. In disk brake systems, particularly in carbon-ceramic brakes which are widely used for motor vehicles, operating temperatures up to 1000° C. may occur. While driving, such high temperatures are not critical since both the brake systems and the adjacent wheels are efficiently cooled by the air flowing around the vehicle, respectively around and through the wheels and the brake systems.

However, if a vehicle is braked from high speed and immediately afterwards parked, such active air cooling is missing. Consequently during up to 30 minutes after braking, a significant heat transfer from the hot brake systems to the wheels may occur. Because brake systems are usually not in direct physical contact with the adjacent wheel, this transfer mainly takes place through radiation and convection, while conduction can almost be neglected. As for disk brakes, the distance between the wheel and the brake caliper as well as the brake disk is usually very low and therefore heat transfer by radiation and convection in this area may be very high. Whereas for conventional wheels made from metals such heat transfer is not high enough to induce thermal damage to the wheels, it may become critical for wheels made from other materials, such as fiber reinforced plastics.

DE 32 24 929 was filed 3 Jul. 1982 on behalf of Motor Wheel Corp. USA and describes a vehicle wheel made from a fiber reinforced resin material. A heat barrier plate is provided at the inboard disk face such that in use it prevents heat transfer from the vehicle's hub to the resin disk in order to prevent creeping in the resin disk material in the region of the wheel's mounting bolt holes.

U.S. Pat. No. 5,538,114 was filed 19 Dec. 1994 on behalf of Jay D. White and Ralph W. Larson and shows an insulating wheel mounting system for reduced heat transfer for drum brake systems used in conventional wheels. According to the patent, an insulating ring is formed at the hub region of the wheel, disposed to be clamped against a drum extension attached to a cylindrical main drum. In an alternate embodiment, the drum extension is coated with a thermal insulating material such that a layer of the insulating material is disposed between the wheel's hub region and the drum extension.

US 2010/194179 was filed 22 Jan. 2010 on behalf of Goodrich Corporation and shows a thermal management composite heat shield which comprises a shield portion and a dissipation portion. The shield portion may comprise a hot side skin, a conduction layer, an insulation layer, and a cool side skin. The dissipation portion may comprise a fin array. Heat absorbed by the shield portion is partially or fully conducted to the dissipation portion for transfer to the ambient environment. According to the published application, the thermal management system may be e.g. be used for aircraft and automotive wheels.

WO 2009/130229 was filed 21 Apr. 2009 on behalf of Zircotec Limited and disk-loses a layer of magnesium zirconate to be applied on a carbon fiber reinforced plastic material in order to obtain good resistance to abrasion and other mechanical damage. The publication also mentions that such a layer is also resistant to corrosion and chemical attack and has good thermal resistance forming a thermal barrier to protect the carbon fiber reinforced plastic material.

SUMMARY OF THE INVENTION

In order to obtain wheels with a low total mass and a low moment of inertia, fiber reinforced plastics comprising e.g. carbon fibers or glass fibers, may be used for rims and wheel centers. Within the context of the present invention "wheel center" should be understood as to include any type of wheel center, such as spoke structures, respectively wheel spiders, or wheel disks. According to another approach, only the rim may be made from a fiber reinforced plastic, while the wheel center is made from a metal, or vice versa. Such types of wheels may also be referred to as "hybrid wheels".

Unfortunately carbon fiber reinforced plastics, which from a structural mechanical point of view offer great potential for obtaining lightweight wheels and therefore are widely used, have only a very limited resistance to heat and at the same time a relatively high thermal conductivity. In specific, many matrices used in combination with carbon fiber reinforced plastics are characterized by a fairly limited resistance to heat. This makes wheels comprising fiber reinforced plastics prone to thermal damage as induced by brake systems of vehicles. Therefore efficient protection from the thermal energy emitted by brake systems is needed, in particular for wheels comprising carbon fiber reinforced plastics.

Although from the prior art several systems to reduce heat transfer from a brake system to a wheel are known, all these systems require additional components which have to be arranged between the brake system (respectively suspension) and the wheel. For many vehicles this is not feasible as the space between wheel and suspension is very limited and thus the systems known from the prior art cannot be applied.

One object of the present invention therefore is to provide a heat shield structure which offers efficient thermal shielding for wheels made at least partially from fiber reinforced plastics and which does not require significant additional space in the region between wheel, brake system and suspension. As a consequence, wheels equipped with heat shield structures according to the invention are suitable for a large range of vehicles without prior modification of the vehicles' suspensions and/or brake systems.

Therefore for wheels comprising a base structure that is at least partially made from a fiber reinforced plastic, a special heat shield structure is arranged on a wheel's base structure and is at least partially covering the base structure at least in the critical areas. Thus the flux of thermal energy into the wheel can be reduced and the deposition of thermal energy can be controlled and distributed, such that hot spots, which would lead to thermal damage, can be prevented. Thus the heat shield structure becomes an integral part of the wheel, allowing a controlled dissipation of thermal energy using the structure of the wheel.

If appropriate, the heat shield structure may comprise at least one heat reflecting layer. Such a layer reflects radiant heat more than it absorbs it. Thus such a layer decreases the flux of thermal energy from the brake system to the wheel, if compared to a wheel without a reflecting layer. Such a layer may be made from a metal, such as e.g. gold or aluminum.

Alternatively or in addition, the heat shield structure may comprise at least one low thermal conductive layer that may serve as a thermal barrier. Such a layer may be made e.g. from a continuum plastic (e.g. aramide, polyamide) and/or a porous plastic and/or a fiber reinforced plastic and/or a continuum ceramic material and/or a fiber reinforced ceramic material and/or a porous ceramic material.

Depending on the application, the low thermal conductive layer may be applied as a coating to the base structure. Therefore e.g. a varnish comprising low thermal conductive components (e.g. ceramic particles) may be used.

Depending on the application, good results may be obtained if the at least one low thermal conductive layer is made from a fiber reinforced plastic containing aramide fibers and/or stone fibers (e.g. basalt) and/or glass fibers which may be embedded in a heat-resistant matrix.

Depending on the geometry of the wheel and/or the brake system, a heat shield structure may also comprise at least one high thermal conductive layer. Such a layer may be used in order to enhance the distribution of thermal energy over a larger area and hence avoid energy concentration, respectively supercritical hot spots that would lead to damage of the subjacent base structure.

Good results may be obtained if a high thermal conductive layer is arranged between a heat reflecting layer and a low thermal conductive layer, the heat reflecting layer being on an outer face of a wheel. Such intermediate layers may be used in order to disperse locally applied thermal energy very efficiently over a larger area and hence to avoid local accumulation of heat which may lead to damage of the subjacent structure.

A high thermal conductive layer may e.g. comprise a metal sheet, metal foil, a metal mesh (grid) or a metal fabric. Alternatively or in addition also sheets, foils, meshes/grids and fabrics made from other materials. Good results may be obtained if materials with a relatively high thermal conductivity are used.

Good results may also be obtained if the high thermal conductive layer also serves as a load bearing structure and hence as a mechanically reinforcing element for the heat shield structure and/or the subjacent base structure.

If appropriate, a heat shield structure may be at least partially embedded in the base structure. Thus the shape (outer geometry) of a wheel will only be insignificantly altered by the presence of a heat shield structure.

A heat shield according to the present invention may be used for wheels that are suitable for motor vehicles (e.g. cars, motorbikes) but is not limited to such vehicles and therefore may also be used for example for aircraft.

A heat shield structure according to the invention will typically be applied at those regions of a wheel which are in the vicinity of the brake disk and/or caliper. However it may also extend to other regions, such as in order to dissipate the deposited thermal energy by distributing it over a larger area. Thus local heat concentration can be omitted and heat transfer out of the wheel by convection and/or thermal radiation can be increased.

Good results may be obtained if a heat shielding structure is arranged in the hub region and/or on the rest of the wheel center and/or on the rim.

It is clear that the present invention may also be used in combination with other systems that prevent supercritical heat transfer between a brake system and a wheel, such as additional heat shields or active cooling systems.

In addition, the present invention is not limited to be used in combination with disk brake systems, but may also be used in combination with virtually any other type of brake system, such as e.g. drum brake systems.

Furthermore it is also clear that the present invention is not only limited to wheels made from carbon fibers reinforced plastics, but may also be used for wheels made from other materials that suffer from similar problems regarding heat resistance.

BRIEF DESCRIPTION OF SEVERAL VIEWS OF THE DRAWINGS

The herein described invention will be more fully understood from the detailed description of the given herein below and the accompanying drawings, which should not be considered as limiting to the invention described in the appended claims.

DETAILED DESCRIPTION OF THE INVENTION

The foregoing summary, as well as the following detailed description of the preferred embodiments, is better understood when read in conjunction with the appended drawings. For the purpose of illustrating the invention, an embodiment that is presently preferred, in which like numerals represent similar parts throughout the several views of the drawings, it being understood, however, that the invention in not limited to the specific methods and instrumentalities disclosed.

Figure 1:
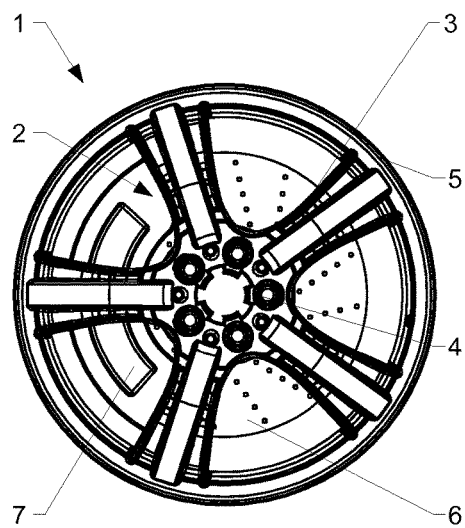
FIG. 1 shows a wheel with a disk brake and a caliper in a frontal view.
Figure 2:
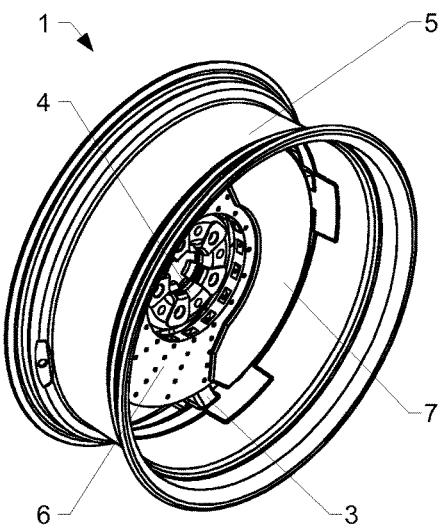
FIG. 2 shows the wheel of FIG. 2 in a perspective view from the back.
Figure 3:
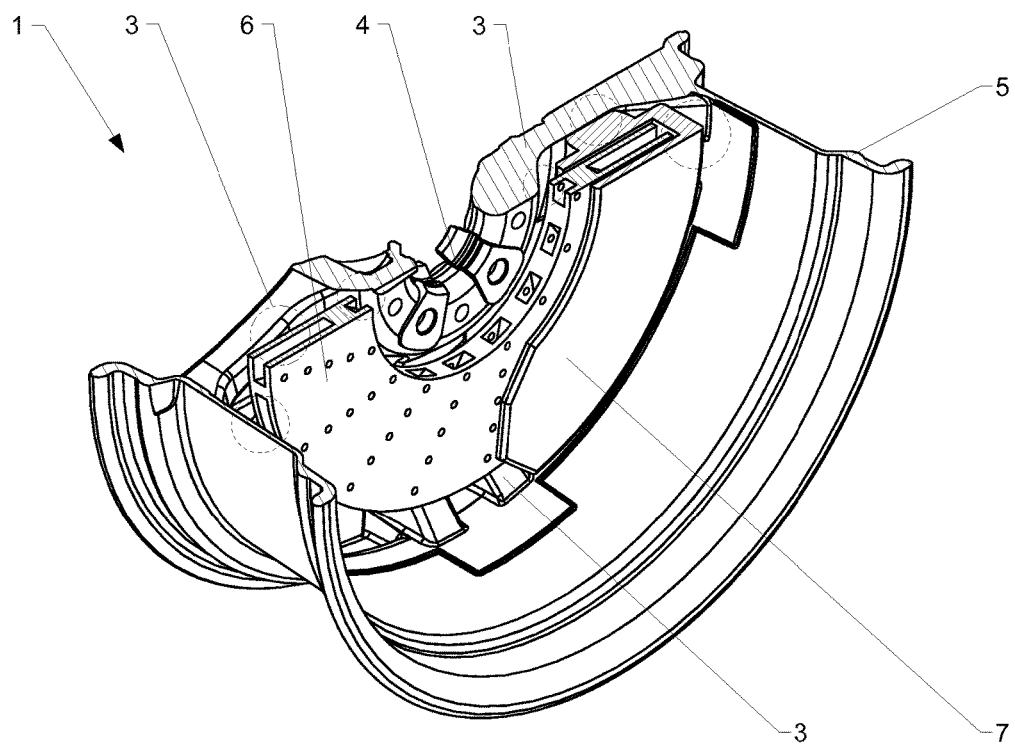
FIG. 3 shows the wheel of FIG. 2 in a perspective view from the back, part of the wheel being clipped for illustrative purposes.

FIGS. 1 to 3 show an embodiment of a wheel 1 together with a disk brake system, comprising a brake disk 6 which is aligned with a caliper 7. Other parts of the wheel suspension have been omitted for illustrative purposes. The wheel 1 of the embodiment shown is made from a fiber reinforced plastic. It comprises a wheel center 2 with several spokes 3 that connect a central hub 4 with a peripheral rim 5, which is designed in order to receive a tire (not shown). As indicated in FIG. 3 by dotted circles, the distance between the brake disk 6 and the spokes 3, the hub 4 and the rim 5 is at some locations relatively small. The same holds true for the distance between the caliper 7 and the spokes 3, respectively the rim 5. This particularly holds true for the protuberances of the caliper 7, where e.g. the pistons for the brake pads (not shown) are arranged. Hence these regions of the wheel 1 are prone to thermal damage due to the heat dissipated by the disk brake system during and after braking.

Figure 4:
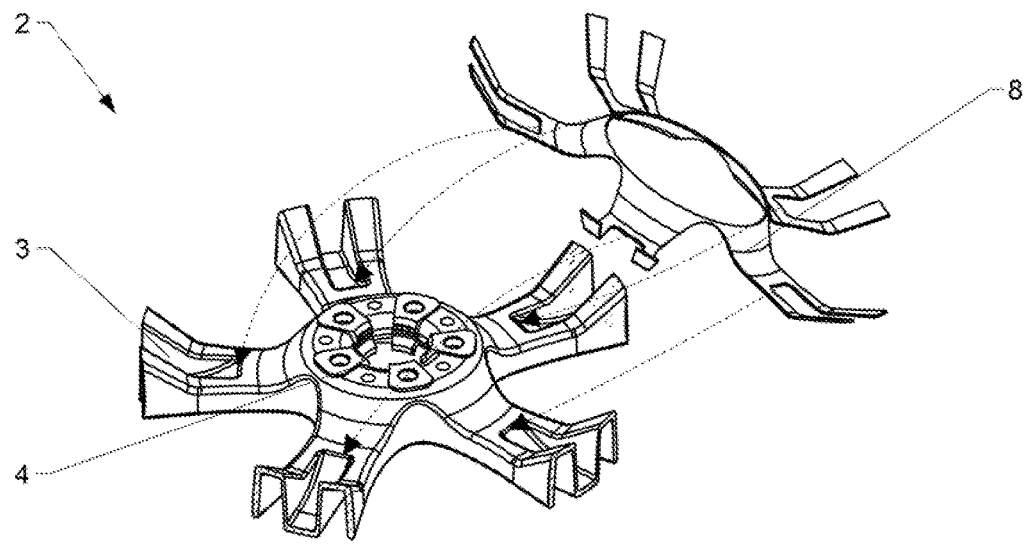
FIG. 4 shows a wheel center and a heat shield structure in a perspective view.
Figure 5:
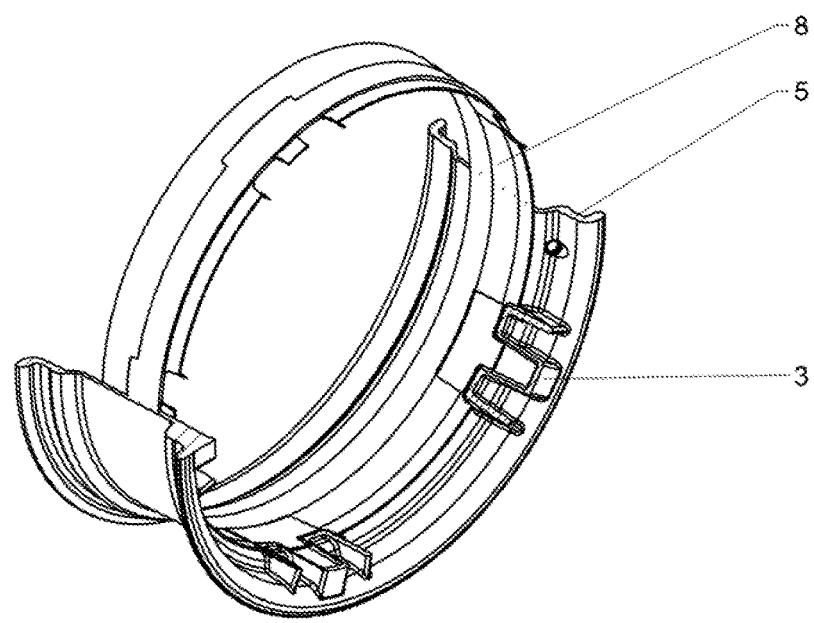
FIG. 5 shows a rim and a heat shield structure in a perspective view, the wheel being partially clipped for illustrative purposes.

Therefore, according to the present invention, these regions of the wheel 1 may be provided by heat shield structures, as shown in FIGS. 4 and 5. FIG. 4 shows a wheel center 2 which is thermally shielded by a heat shield structure 8 that is positioned on the wheel's surface that is in critical proximity to the disk brake system (not shown). In the embodiment shown, the region adjacent to the hub 4 as well as parts of the spokes 3, may be protected by such a heat shield structure 8. As shown in FIG. 5, also the inner (centripetal) surface of the rim 5 may be thermally shielded by such heat shield structures 8.

Figure 6:
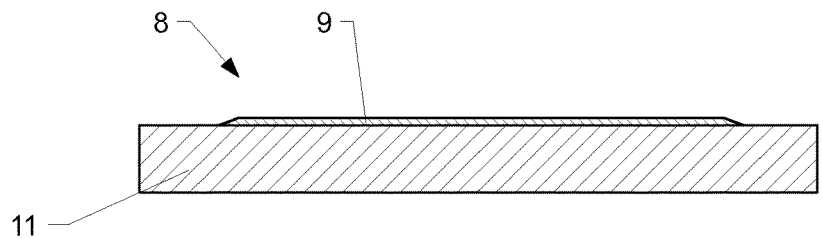
FIG. 6 shows a first embodiment of a heat shield structure arranged on a base structure.

FIGS. 6 to 11 show different variations of heat shield structure 8 which may be used in order to protect a subjacent base structure 11 from thermal damage. FIG. 6 shows a first variation of a heat shield structure 8 comprising a heat reflecting layer 9 which is arranged on the surface of a base structure 11 which is made from a fiber reinforced plastic. The heat reflecting layer 9 comprises a layer that is made from a material which reflects radiant heat more than it absorbs it. Suitable materials may be a metals, as e.g. aluminum or gold. Such a type of heat shield structure 8 may be applied as some type of coating for the base structure 11.

Figure 7:
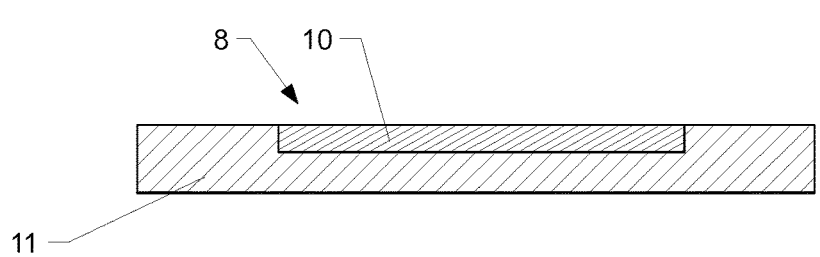
FIG. 7 shows a second embodiment of a heat shield structure arranged on a base structure.

FIG. 7 shows another variation of a heat shield structure 8, comprising a low thermal conductive layer 10 that is embedded in the base structure 11. The heat shield structure 8 itself has a high heat resistance and protects the base structure 11, which in contrast may be made from a relatively thermosensitive material, such as a carbon fiber reinforced plastic, from thermal damage. Such a type of low thermal conductive layer 10 prevents that heat input on the surface is conducted into the solid. As the heat shield structure 8 is embedded in the base structure 11, the outer shape, respectively geometry, of the wheel 1 is not affected by the presence of the heat shield structure 8.

Figure 8:
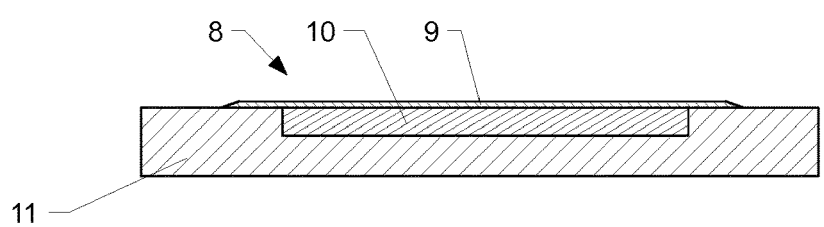
FIG. 8 shows a third embodiment of a heat shield structure arranged on a base structure.

FIG. 8 shows another variation of a heat shield structure 8 which comprises a heat reflecting layer 9 and a subjacent low thermal conductive layer 10 that is embedded in the base structure 10. Hence using such a variation of a heat shield structure 8 allows combining the concept of minimizing heat deposition on the surface of the structure with the concept of minimizing heat transfer to the subjacent thermosensitive base structure 11.

Figure 9:
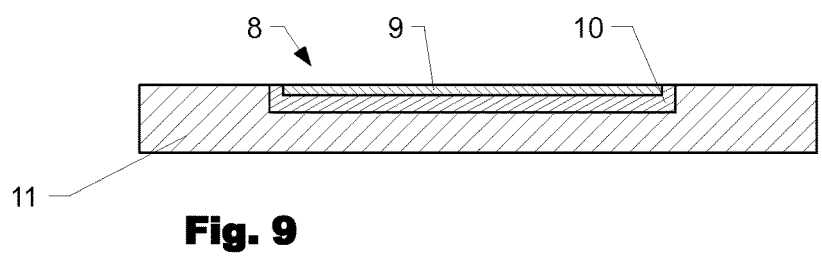
FIG. 9 shows a fourth embodiment of a heat shield structure arranged on a base structure.
Figure 10:
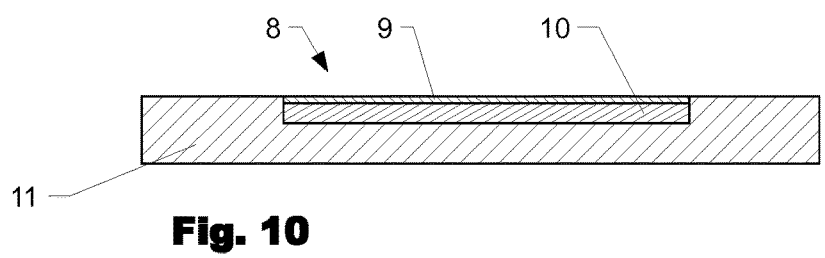
FIG. 10 shows a fifth embodiment of a heat shield structure arranged on a base structure.
Figure 11:
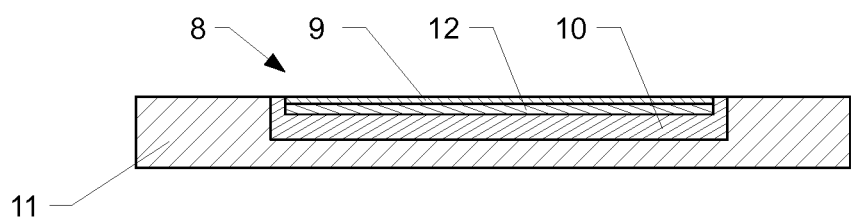
FIG. 11 shows a sixth embodiment of a heat shield structure arranged on a base structure.

As shown in FIGS. 9 and 10, in a variation of the invention a heat reflecting layer 9 and a low thermal conductive layer 10 may also both be embedded in the base structure 11. As indicated in FIG. 9, in some variations of the invention a heat reflecting layer 9 may be embedded in a low thermal conductive layer 10 without being in direct physical contact with the base structure to be protected from thermal damage. Therefore the heat reflecting layer 9 may even be heated up to high temperatures without inducing damage to the base structure 11. In the variation shown in FIG. 10 a heat reflecting layer 9 is embedded in the base structure 11 while fully covering the subjacent low thermal conductive layer 10. Such a variation may e.g. be used for application where thermal deposition is very localized and the heat reflecting layer 9 serves also to distribute the deposited thermal energy to a larger area and decrease by thermal radiation and convection. FIG. 11 shows a variation of a heat shield structure 8 which comprises a high thermal conductive layer 12 which is embedded in a low thermal conductive layer 10 in order to improve distribution of thermal energy over a larger area. The heat shield structure 8 shown in FIG. 11 further comprises a heat reflecting layer 9.

The invention claimed is:

1. A wheel (1), the wheel (1) comprising:
a base structure (11) at least partially made from a composite material, and a heat shield structure (8) arranged on the base structure (11) and at least partially covering the base structure (11), the heat shield structure (8) comprising at least one high thermal conductive layer (12), wherein the heat shield structure (8) is arranged in a hub region (4) of the wheel and/or on other parts of the wheel center (2) and/or a centripetal surface on a rim (5) of the wheel, wherein the heat shield structure (8) comprises a mesh that is at least partially embedded in the base structure (11).

2. The wheel (1) according to claim 1, wherein the heat shield structure (8) comprises at least one heat reflecting layer (9).

3. The wheel (1) according to claim 2, wherein the at least one heat reflecting layer (9) is made from a metal or a ceramic material.

4. The wheel (1) according to claim 1, wherein the wheel is used for a motor vehicle or an aircraft.

5. The wheel (1) according to claim 1, further comprising at least one low thermal conductive layer (10) made from at least one of a continuum plastic, a porous plastic, a fiber reinforced plastic, a continuum ceramic material, a fiber reinforced ceramic material, and a porous ceramic material.

6. A heat shield structure (8) for a wheel (1), the wheel (1) comprising:
a base structure (11) at least partially made from a composite material, wherein the heat shield structure (8) is arranged on the base structure (11) and at least partially covers the base structure (11), wherein the heat shield structure (8) comprises at least one high thermal conductive layer (12).

* * * * *